US009836730B1

(12) United States Patent
Metrailler et al.

(10) Patent No.: US 9,836,730 B1
(45) Date of Patent: Dec. 5, 2017

(54) SOFTWARE PRODUCT PIRACY MONETIZATION PROCESS (71) Applicant: Corel Corporation, Ottawa (CA)

(72) Inventors: Gerard Metrailler, Orleans (CA); Alireza Fakhraei, Ottawa (CA)

(73) Assignee: Corel Corporation, Ottawa, Ontario (CA)

(*) Notice: Subject to any disclaimer, the term of this patent is extended or adjusted under 35 U.S.C. 154(b) by 888 days.

(21) Appl. No.: 13/957,419

(22) Filed: Aug. 1, 2013

Related U.S. Application Data (63) Continuation-in-part of application No. 13/826,836, filed on Mar. 14, 2013.

(51) Int. Cl.
G06F 9/44 (2006.01)
G06Q 20/12 (2012.01)
G06Q 50/18 (2012.01)

(52) U.S. Cl.
CPC ....... *G06Q 20/1235* (2013.01); *G06Q 50/184* (2013.01)

(58) Field of Classification Search
CPC .............................................. G06Q 20/1235
USPC ................................... 717/168–177; 709/203
See application file for complete search history.

(56) References Cited

U.S. PATENT DOCUMENTS

| | | | | |
|---|---|---|---|---|
| 6,035,403 A * | 3/2000 | Subbiah | ................... | G06F 21/10 726/28 |
| 6,151,643 A | 11/2000 | Cheng et al. | | |
| 6,542,943 B2 | 4/2003 | Cheng et al. | | |
| 6,697,948 B1 * | 2/2004 | Rabin | ..................... | G06F 21/10 705/52 |
| 7,051,211 B1 * | 5/2006 | Matyas, Jr. | ............... | H04L 9/08 380/201 |
| 7,316,013 B2 * | 1/2008 | Kawano | .................... | G06F 8/65 717/168 |
| 7,331,063 B2 * | 2/2008 | Gunyakti | ................ | G06F 21/12 705/57 |
| 7,389,504 B2 * | 6/2008 | Kawano | .................... | G06F 8/65 717/168 |

(Continued)

OTHER PUBLICATIONS

Genov "Designing Robust Copy Protection for Software Products", ACM-International Conference on Computer Systems and Technologies, pp. 1-6, 2008.*

(Continued)

*Primary Examiner* — Anil Khatri
(74) *Attorney, Agent, or Firm* — Rosenberg, Klein & Lee (57) ABSTRACT A method includes a step of providing a computer readable non-transitory storage medium comprising a computer readable code as a software product configured to run on a local computer and configured to perform a software piracy monetization process. The software product includes one or more configurable features having a feature property, the feature property including a state. The method further includes running the computer readable code on the local computer, and collecting, by the software product running on the local computer, hardware fingerprint data from the local computer. The method further includes connecting with a computer feature server, and determining if the software product is legitimate. If not, the method includes a step of sending a message to the local computer. The message includes instructions to change the state of a feature property of the software product to alert a user that the software product is not legitimate.

15 Claims, 6 Drawing Sheets

(56) References Cited

U.S. PATENT DOCUMENTS

| | | | |
|---|---|---|---|
| 7,600,130 B2* | 10/2009 | Ooi | G06F 21/78 713/169 |
| 7,742,992 B2* | 6/2010 | Cronce | G06F 21/10 705/51 |
| 7,752,139 B2 | 7/2010 | Hu | |
| 7,921,059 B2 | 4/2011 | Chicks et al. | |
| 8,224,750 B1 | 7/2012 | Bennett et al. | |
| 8,650,557 B2* | 2/2014 | Ogura | G06F 21/10 717/169 |
| 8,661,406 B2* | 2/2014 | Shapiro | G06F 8/61 713/2 |
| 8,725,649 B2* | 5/2014 | Gan | G06F 21/125 705/59 |
| 9,059,985 B1* | 6/2015 | Treleaven | H04L 63/08 |
| 9,165,332 B2* | 10/2015 | Li | G06F 21/105 |
| 9,219,734 B2* | 12/2015 | Risan | H04L 63/08 |
| 2009/0089752 A1 | 4/2009 | Tristram | |
| 2009/0260002 A1 | 10/2009 | Volovic et al. | |
| 2011/0145789 A1 | 6/2011 | Rasch et al. | |
| 2013/0067447 A1 | 3/2013 | Sannidhanam et al. | |

OTHER PUBLICATIONS

Collberg et al, "Dynamic Graph-Based Software Fingerprinting", ACMTransactions on Programming Languages and Systems, vol. 29, No. 6, Article 35, pp, 1-67, 2007.*

Barrera et al, "Understanding and Improving App Installation Security Mechanisms through Empirical Analysis of Android" ACM, pp. 81-92, 2012.*

Herrick et al, "Sustainable Automated Software Deployment Practices", ACM, pp. 189-196, 2013.*

Heiner et al, "Secure Software Installation in a Mobile Environment ", ACM, pp. 155-156, 2007.*

Becker et al, "Managing Combinatorial Software Installations with Spack", IEEE, pp. 14-23, 2016.*

Chouta et al, "Side Channel Analysis on an Embedded Hardware Fingerprint Biometric Comparator & Low Cost Countermeasures", ACM, pp. 1-6, 2014.*

Mohammadzadeh et al, "Evaluation of Fingerprinting Techniques and a Windows-based Dynamic Honeypot", ACM, pp. 59-66, 2013.*

* cited by examiner

SOFTWARE PRODUCT PIRACY MONETIZATION PROCESS

CROSS REFERENCE TO RELATED APPLICATION

This is a continuation-in-part of the invention described in U.S. patent application Ser. No. 13/826,836, filed Mar. 14, 2013 by at least one of the same inventors herein, titled "System And Method For Software Feature Management." The invention described in U.S. patent application Ser. No. 13/826,836 is assigned to the assignee hereof.

FIELD OF THE INVENTION

This disclosure relates to feature management and more particularly to the management of features of a computer program.

BACKGROUND OF THE INVENTION

Computer programs, also referred to as software, software products, or application programs, are often made available at the same time in more than one version. The different versions of a computer program generally vary by the number of features made available to a user of the computer program. The most common way to install a given version of a computer program is to install the entire framework of that version of the computer program. Accordingly, when upgrading an already installed computer program, a successive installation usually replaces the existing computer program framework during the subsequent installation. This user process of upgrading an already installed computer program by replacing the currently installed program framework is inefficient.

One common method of marketing a software product is to offer a trial version with limited features. The trial version may include reduced functionality, or it may be fully functional but only for a limited period of time, or both. After an evaluation or trial period, the user may be offered the opportunity to upgrade the trial version of the software to a full version. In many cases, the end user agrees to a perpetual license of the fully functional software, subject to terms and conditions prohibiting, for example, copying, modifying, editing, or distributing the software.

Trial version software can be distributed to the user by a variety of different means. The most common method today is to transfer the product electronically (e.g., download) over a network, such as streaming or packetized data sent over local or wide area networks (intranets), the Internet, and wireless networks.

Once installed on the user's local computer, the computer program, be it a trial version or fully functional version, may be accessed and used by anyone who happens to possess it. This can present a problem for software manufacturers in that it facilitates the illegal copying and distribution of their software products (e.g., pirating). In effect, each valid copy of a downloaded program can be used as a master to generate illegal copies, or can also be used as a platform for hackers to experiment and ultimately exploit its vulnerabilities.

Software piracy occurs when software is illegally copied, sold or improperly licensed. Forms of piracy include Internet piracy, or the downloading of product serial numbers, key generators, software cracks, and illegal versions of products. Another form of piracy is straight-forward counterfeiting, when multiple copies are illegally made and distributed by CD or DVD. Yet another form of software piracy is end user piracy, when someone makes or distributes software copies without paying for or having a valid license for the number of copies in their possession. Examples of end user piracy include companies that buy volume licenses but under-report the additional copies of software they've made; or companies that give employees network access to software, and don't monitor the number of downloads in order to ensure they're still compliant with their license agreement; or companies or individuals who share software among friends, allowing them to illegally copy the product without paying for it. A less blatant but very common form of software piracy includes softlifting, when a single license copy of a software program is purchased and then loaded onto multiple machines, contrary to the terms of agreement. Gray market piracy occurs when unauthorized resellers sell software at unusually low prices, undercutting the authorized/legitimate resellers. Gray market piracy can occur in several different forms, such as selling illegitimate OEM software; selling academic software to unauthorized or non-academic organizations; distribution of CD Only products or replacement CDs; and selling Not For Resale (NFR) software.

Software piracy has become a financial burden to the software industry as well. Popular software programs, sold in the tens or hundreds of millions, may have pirated versions numbering in the millions. This represents a significant percentage of potential sales, and erodes already-strained profit margins in an industry with stiff competition.

Although some anti-piracy and copy protection schemes currently exist to protect distributed software, these systems are typically not adequate to protect against a determined attack to break the protection. Moreover, once a program has been hacked, it is usually quite easy for the hacker to produce downloadable tools that eliminate the protection. The time it takes to crack a software application security system is typically measured in hours or, at most, a few days. This means that as soon as a pirate gains possession of the software, it is often a simple matter to remove existing digital rights management tools, such as copy protection, and sell or distribute illegal copies of the software.

SUMMARY OF THE INVENTION

An aspect of the present invention provides a software product piracy monetization process. The process includes: providing a computer readable non-transitory storage medium storing computer readable code as a software product; running the code on a local computer; collecting hardware fingerprint data from the local computer; determining whether the software product is legitimate; and sending a message to the local computer if a result of the determining is negative. The software product may be configured to run on a local computer and to perform a software piracy monetization process. The message may include instructions to change the state of a feature property of the software product to alert a user that the software product is not legitimate.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

As described hereinabove, during an installation of a different version of the same program (e.g. a version offering a premium feature set), a computer program is typically re-installed as a new computer program framework which completely replaces the installed computer program framework. Such a complete replacement of the framework is inefficient. The framework replacement approach means delivery of a relatively large amount of computer code, either by download, as over the Internet, or by an actual transfer of physical media such as by a distribution CD or DVD.

An alternative computer distribution model installs a full featured framework of the computer program. Many of the features of the computer program can have an associated feature property. The feature property can have states such as, for example, an enabled state, a hidden state, or a disabled state (i.e. non-enabled). There can also be a displayed state, or a displayed state with an indication. Features can be displayed, for example, with an indication of the current state of one or more configurable features. Such displays can include an indication of feature availability, feature non-availability, or an offer for purchase of a currently non-enabled feature. The indication can be a graphical on-screen indication, such as, for example, a different color font of the text of a displayed feature name, and/or a shaded background for foreground brightness level or color, displayed color, brightness of color, a displayed superimposed shaded box, etc. associated with a feature selection having feature property currently set to a certain feature property state. While the feature property can be similar in nature to other properties of the computer program, such as, for example, properties of objects, the feature property by design, cannot typically be accessed by a user of the computer program, nor can its state typically be set or changed by the user of the installed computer program. The states of one or more of the property features can be pre-set for a distribution copy of the computer program, such as a user might purchase in the form of a DVD or by online download of computer program installation file.

The states of one or more of the property features can be changed by the computer server, such as, for example, a feature computer server on the Internet. Following installation of the computer program, the computer program can connect to the feature server to determine what features are available to a user of any particular installation of the computer program. The computer program can connect one or more times to the feature server. The feature server can identify by any suitable means which particular installation of a computer program is connecting to the server. The computer program can then retrieve a corresponding property feature record for that installed computer program to arrange one or more configurable features of the computer program as per the feature property state information contained within the downloaded or otherwise accessed property feature record. For example, an automated request (transparent to the user) for the current states of a set of property features for a particular installed computer program can be accompanied, for example, by a serial number associated with that particular installed computer program, a computer identification of the computer on which the computer program is installed, or a user name based on a user logon to the installed program. For any given query, the feature server can return information which then configures the states of property features of a set or subset of configurable property features. The installed computer framework is thus remotely feature configurable by the feature server and the underlying program framework no longer needs to be replaced to change the availability of one or more of the configurable features of the computer program.

Figure 1:
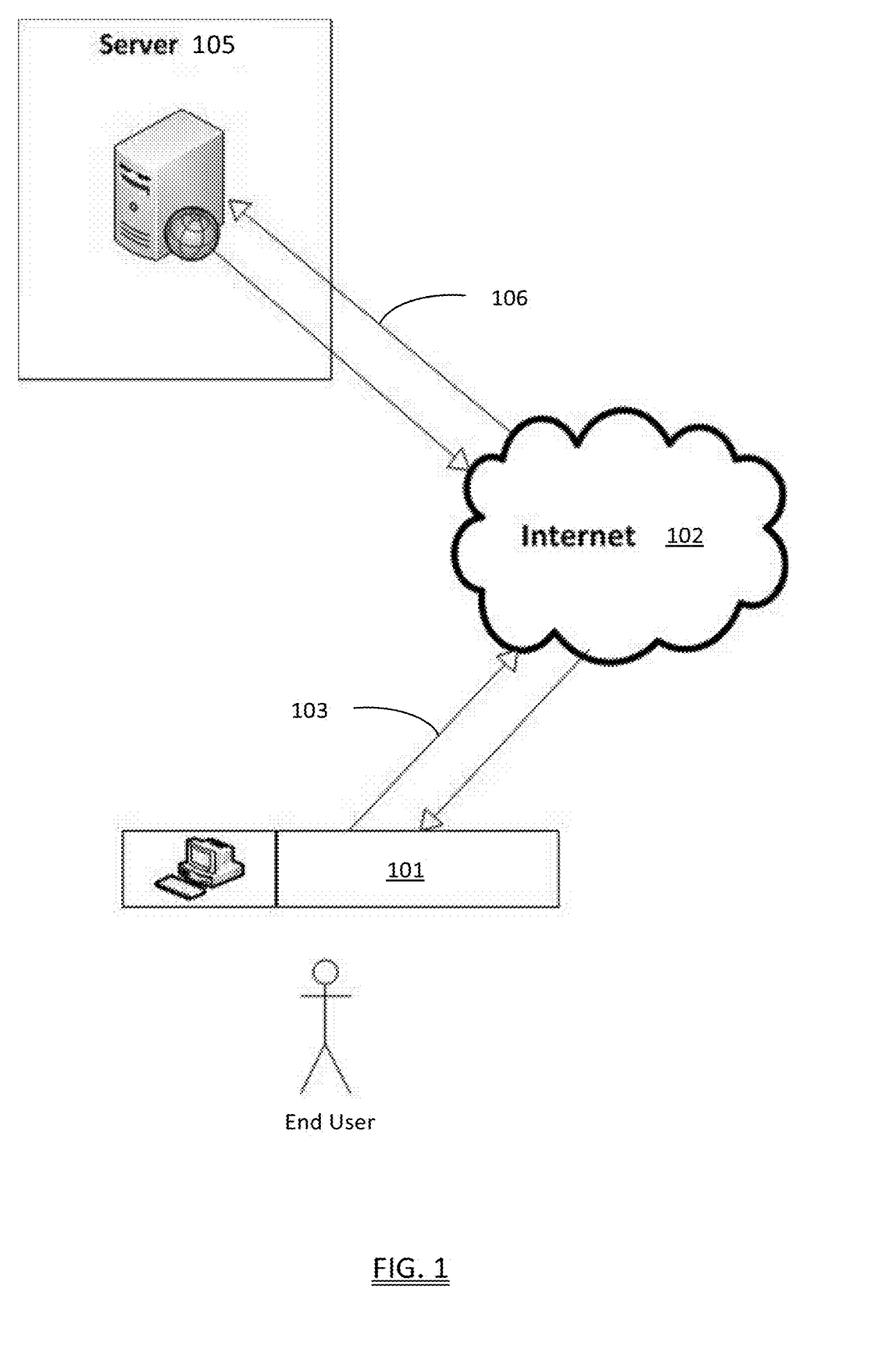
FIG. 1 depicts a block diagram of one exemplary system suitable to perform the processes described herein.

FIG. 1 shows a block diagram of one exemplary computer system suitable for performing the software piracy monetization computer described herein. One or more local computers 101 (e.g., a client computer) are connected via any suitable data connection 103 (e.g., cable modem, WiFi, WiMAX, FioS, DSL, local or wide area Ethernet network connections, etc.) typically via an Internet connection, to any suitable cloud 102 (typically the Internet). A computer server 105, such as, for example, a software company server, is communicatively coupled to the network, such as the Internet, by any suitable wired or wireless means 106. In one embodiment of the invention the computer server 105 may be configured as a software company's feature server. The one or more local computers 101 can run a software product, such as for example, a digital painting or drawing program. A user at a local computer 101 has an installed copy of a software product manufactured by the software company.

Figure 2:
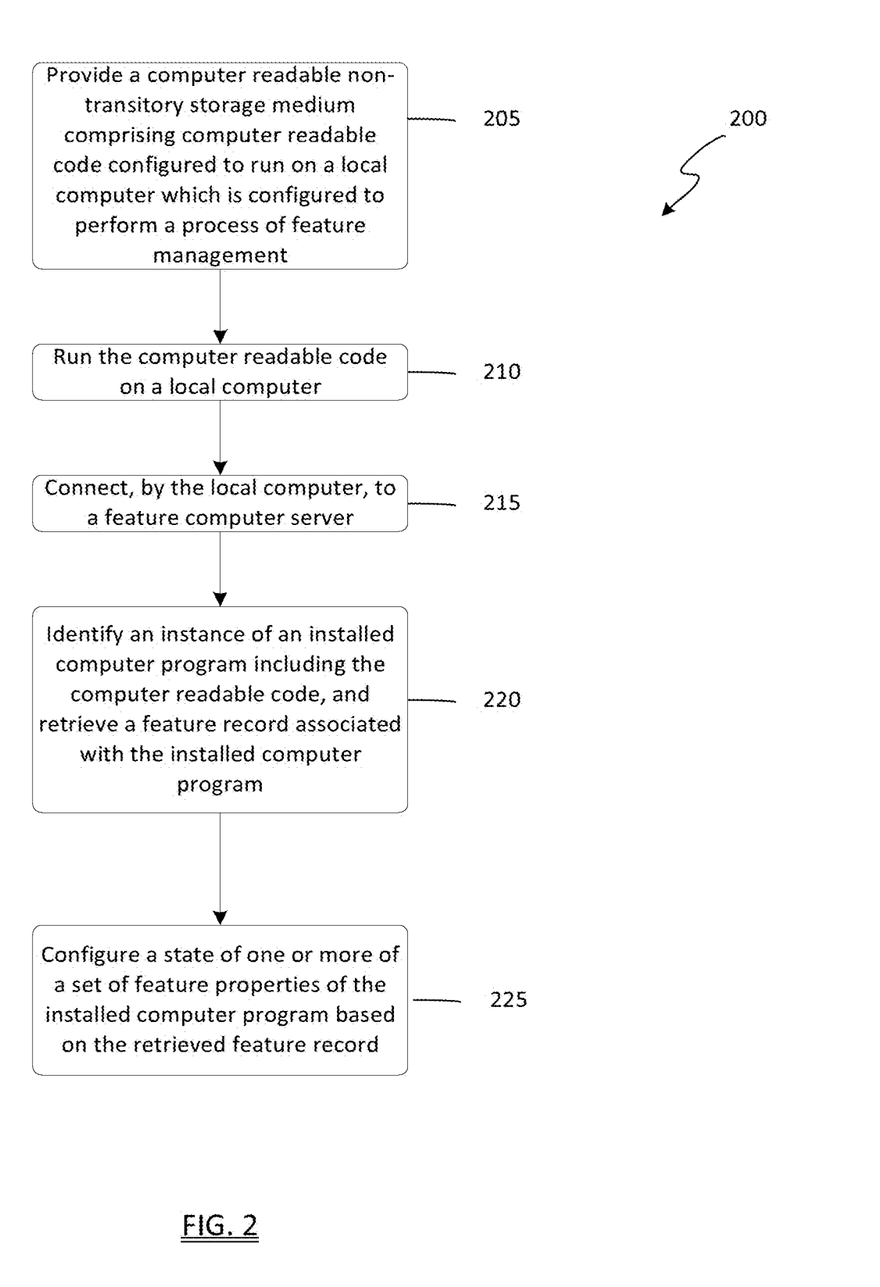
FIG. 2 depicts a flow chart of one exemplary embodiment of a process to manage the features of a computer program.

FIG. 2 shows a flow chart of one exemplary embodiment of the process. The process 200 for feature management includes the steps of: providing a computer readable non-transitory storage medium comprising a computer readable code configured to run on a local computer which is configured to perform a process of feature management (step 205); running the computer readable code on a local computer (step 210); connecting, by the local computer, to a feature computer server (step 215); identifying an instance of an installed computer program including the computer readable code, and to retrieve a feature record associated with the installed computer program or the member from the feature server (step 220); and configuring a state of one or more of a set of feature properties of the installed computer program based on the retrieved feature record (step 225). The steps of the exemplary process 200 can be better understood in the examples and detailed description hereinbelow.

Example 1

A computer software company offers a computer program in a standard and a premium version. A user obtains one distribution version of the computer program (either standard or premium), such as by purchase of downloadable software or by purchasing a distribution disc such as a distribution DVD. Either by information entered during an online purchase, or by initial online registration, a record is created at the feature server for that user's purchase which indicates whether the user purchased a standard or premium version of the computer program. The computer program is then installed on any suitable computer. During program startup (following installation of the computer program)

and/or a user logon to the computer program, an automated request (transparent to the user) for the current states of a set of property features is sent to the feature server. The feature server returns information to the computer program which configures the states of property features of a set of property features of the computer program. In Example 1, the information returned by the property feature servers configures the features of the installed computer program consistent with the most recent purchase of a standard or premium version of the computer program.

One advantage of a computer program having remotely configurable property features is that a software company can change the feature set available at any level of purchase at any time. Continuing with the example of a computer program distributed in both a standard version, and a premium version which offers more features than the standard version, at some later date following the first use of the computer program, either the standard user or the premium user can be offered a different, typically larger, set of available features. In other words, the company can later re-define what features are made available by the different featured versions of a program.

Subscription Based Features:

Another application for a complete framework having all features installed with at least some of the features controlled by a property feature as described herein is a subscription based purchase program. In a subscription based purchase program, a user purchases a level of features, such as by purchase subscription of a standard subscription or a premium subscription. By contrast with the purchase of a feature version as described hereinabove, a subscription purchase typically includes both a feature set (e.g. a version with certain user available features) and a time duration for the availability of those features. In a subscription embodiment, the user feature record or computer ID feature record further includes the authorized time duration for the subscription purchase. In some cases, the purchase model could be combined with a subscription model, where some features of a previously purchased version can be made available on a time limited subscription basis (generally including an ability to re-subscribe as desired). There could also be made available an option to purchase a program version following a subscription period.

Example 2

A user installs a computer program. The user, without any connection to a feature server, has available the features of the standard version of the computer program. The user then purchases a one year subscription to the premium version of the computer program under a user name. Following the purchase of the subscription, the user starts the computer program. The user enters a user name into a logon field of the computer program at which point, the computer program connects to the feature server and requests (transparent to the user) a current list of the states of property features, wherein, if still within the one year subscription period of time, the feature server returns information to the computer program which then configures the states of property features of the computer program for the premium version of the computer program. Beyond one year from the start date of the one year subscription (if a renewal has not yet been purchased) the feature server returns information to the computer program which configures the states of property features for the standard version of the computer program. There can also be information returned by the feature server that can prompt the user to renew the subscription. Some computer programs installed only for use by subscription can be feature limited or severely feature limited following expiration, without timely renewal, of a subscription program.

Offer for Feature Purchase and/or Computer Program Upgrade:

Yet another aspect of feature management by feature server is the ability for the computer program to offer presently unavailable features to a user for purchase. Such offers can range from an indication of availability, an offer with additional information (e.g. a "teaser" in advertising parlance), to a full offer for sale with information and user selectable link or clickable link. The offer can be for individual premium features, selected sets of premium features, a premium version of the computer program, or a premium subscription to the computer program. Such offers can be made during normal use of the computer program. In some cases, there can be user settable options where such offers can be optionally displayed or not displayed by choice of the user of the computer program.

A drop-down menu of features or a window of feature selections (also called a docker) can list features which are not enabled. In one contemplated embodiment, a user indicating an interest in a non-enabled (disabled) feature, such as by a user "mouse over" or mouse "hover" or any other user attempt to click on or otherwise to select the presently non-enabled feature, can cause the computer program to generate a message or instruction indicating what type of purchase or version upgrade would enable that feature. Further, the message can include a user controlled input option, typically by a clickable link, which can direct the user to a purchase site, such as a purchase website. Following a successful purchase of the feature, or more likely of a program version or program subscription package that includes the desired feature, the user's record is updated at the feature server. The computer program, alerted to a possible purchase by operation of the purchase link, can connect to the feature server to download the latest record. If the user made a successful purchase, the user's updated record will reflect the newly available features and the computer program will then make available to the user the newly purchased feature as an enabled feature. Alternatively or additionally, the next time the computer program is started and/or the next time the user logons to the computer program, newly purchased features can show as available features.

Example 3

A user "mouse over" of a premium feature not currently available on the user's purchased version of the computer program and/or through their level of user subscription causes a prompt to show on the computer screen. The prompt notifies the user that the feature of the user's interest is available in the premium version of the computer program. A clickable link offers the user a path to purchase a premium subscription to the computer program. The user follows the path and successfully completes the purchase of a premium subscription. Either by detecting the user activity of having followed the purchase path to a successfully completed purchase, and/or by a successive program start and/or user logon to the computer program, the program connects to the feature server and retrieves the updated user's record. The original non-enabled feature of interest is now enabled.

There can be a number of ways to show one or more non-enabled features to a user. For example, a non-enabled feature can be displayed in a menu or in a docker in a different color than the enabled features, such as by a grey text font for a non-enabled feature compared with a black font for enabled features. There can also be a translucent box which covers a non-enabled feature. Similarly, premium features can be shown in a different color, such as, for example, a blue text item in a list or in a docker, the blue text denoting premium items compared with a black text for standard features. The brightness or intensity of a colored font could also be modified to indicate an enabled or non-enabled feature. For example, a dimmed brightness or a light shade of the same color could be used to indicate a non-enabled feature, and a "standard" brightness or regular shade of the same color could be used to indicate an enabled feature. In a worst case scenario, such as, for example, for known pirated installations, there could be an opaque box drawn on the screen over one or more features.

Interception of Mouse Clicks:

Computer programs typically identify a feature selection by cursor control, as is typically accomplished by a mouse controlled (user driven) cursor position followed by a mouse click. In such cases one technique to control the access to features is to generate a screen mask which matches a user displayed screen. For a region of the screen about one or more displayed user selectable features, the display mask, which is typically not visible to a user of the screen, can pass or intercept mouse clicks. Thus if a feature is enabled, a user mouse click operates the feature normally. However, if that feature is presently disabled, the mask can intercept any mouse clicks made in an attempt to select the non-enabled feature. Moreover, as described hereinabove, mouse clicks over a non-enabled feature can optionally cause a prompt to be made to the user offering information on what version includes the desired non-enabled feature and/or how to purchase the non-enabled feature.

Features can be defined at build time using "feature groups" which describe the feature state (enabled, disabled, or hidden) for each of the entitlement states (not-started/signed-in, signed-in, and expired).

Example 4

These feature groups can then be applied to each feature as follows:
// Premium Feature Group definition
premium=
{
  local_sub=msf_entry:new{TrialNotstarted=disabled, TrialNotExpired=disabled, TrialExpired=disabled, Activated=disabled},
  premium_sub=msf_entry:new{TrialNotstarted=disabled, TrialNotExpired=enabled, TrialExpired=disabled, Activated=enabled},
  premiumtrial_sub=msf_entry: new{TrialNotstarted=disabled, TrialNotExpired=enabled, TrialExpired=disabled, Activated=enabled},
  pure_sub=msf_entry:new{TrialNotstarted=disabled, TrialNotExpired=enabled, TrialExpired=disabled, Activated=enabled},
  Subscription=true
}
// Some feature declarations
Features::Styles::Previews={"31a3bbff-5364-1483-47d1-c7a9dea84022", Subscription=true}
Features::Color::Styles::ConvertToGrayscale={"f932ddf7-bb7c-414a-b786-cbd18ad98afc", Subscription=true}
Features::Color::Styles::AdvancedViewOptions={"cecdb1b4-22ab-949d-40d2-dd837c0bfac9", Subscription=true}
// Some feature status definitions
Features::Styles::Previews.status=premium
Features::Color::Styles::ConvertToGrayscale.status=premium
Features::Color::Styles::AdvancedViewOptions.status=premium At the server-side entitlements, a product of a build can be uploaded to the server. At run-time the application might query the feature status explicitly, for example:
If (FeatureManagment::Features::Color::Styles::ConvertToGrayscale)
  // do something only allowed when convert to grayscale on.

Or features can be automatically controlled by the user interface (UI) Framework which supports the enabled, hidden, and disabled (teaser) states automatically by virtue of the feature identifiers matching the UI-Element or control identifiers (e.g. globally unique identifiers (guids) matching the UI-Element or control guids). Suitable guids include those which follow the universally unique identifier (UUID) standard.

Now in more detail, in one exemplary embodiment, the base-class of each UI control supported by the UI Framework includes an aspect or part known as an itemOverlay. In some embodiments, the itemOverlay in this case includes a win32 window whose life-time, appearance, and mouse-click handling are manipulated according to the Feature Status of the particular item to: 1) do nothing (enabled); 2) highlight the item (premium or other reason to draw attention); 3) prevent use, or intercept use to put up some information—for example how to purchase (teaser); or 4) hide completely (hidden).

It is unimportant what operating system is used. Computer programs having feature properties and process techniques as described herein can be written for use with any suitable computer operating system. The Windows™ operating system available from the Microsoft Corporation of Redmond, Wash. is but one example of a suitable operating system.

It is unimportant to the processes described herein what type of local computer (e.g., a client computer) is used by a user. It is also unimportant to the processes described herein what type of computer is used by the feature computer server. Typically, the local computer is physically accessible by a user of the local computer. A computer can include any suitable type of computer having any suitable operating system. It is further contemplated that the inventive techniques as described herein can be practiced on any suitable computer based device having a computer processor or firmware which simulates the functions of a computer processor.

In most embodiments, the feature server identifies an instance of the installed computer program. The identification can take place in both non-subscription (e.g. purchased) installations as well as for subscription based accounts. In one embodiment, the step of identifying an instance of an installed computer program includes identifying an instance of an installed computer program by an identification string. The identification string can be any suitable type of identification string and can include numbers, and/or characters, and/or symbols. The identification string can be a serial number, such as a serial number entered by a user following purchase of a computer program. The identification string can also be an identification of a local computer, such as for example a name or number or manufacturer hardware serial number or serial number or any other suitable identification of an installed instance of an operating system. The identification string can be a user name or an identification string which represents a login by a particular user at a local computer. The identification of a particular user can also be used to identify a particular subscription account.

Example 5: Piracy Monetization

As noted above, one common method of marketing a software product is to offer a trial version with full functionality but only for a limited period of time, such as 30 days. In this example, a trial version of the computer program is downloaded to a user's computer. The installed trial version may be a full featured framework of the computer program, but after the trial period has expired, the computer program reverts to a non-functional "viewer mode" unless the user initiates an activation process. The activation process may include, for example, contacting the manufacturer and purchasing a perpetual license to the computer program, obtaining a serial number and activation key from the manufacturer or seller, and, upon entering the serial number and activation key from a user interface in the software, converting the trial version of the software into a fully-functioning version. The activation may be performed online through the seller's web site, or may be conducted by telephone.

In one embodiment of the invention, the installed software product includes an in-product messaging (IPM) platform that communicates with a feature server on the Internet to determine what features are available to a user of the particular installation of the computer program. In the present example, the feature server can determine if the installed computer program is legitimate or a pirated copy. If the program is not legitimate, features can be turned off, such as, for example, access to the fully functional version of the program. Additionally, features can be provided for the pirate to purchase a legitimate copy, thereby creating monetary value for the software company.

Figure 3A:
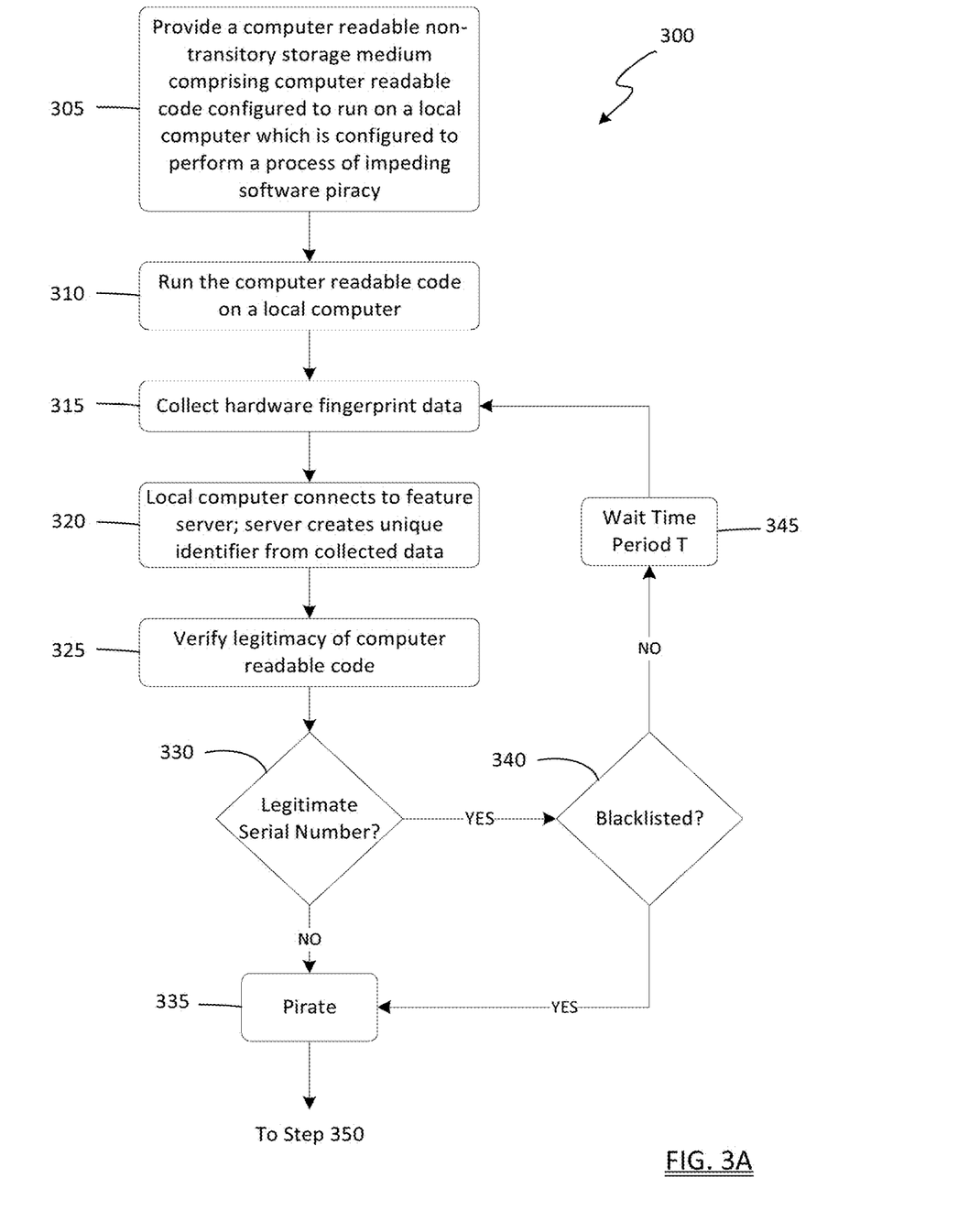
FIGS. 3A and 3B are block diagrams collectively presenting a flow chart illustrating an exemplary embodiment of the method for software piracy monetization.

Turning now to FIG. 3A, shown is a block diagram collectively presenting a flow chart illustrating an exemplary embodiment of a process 300 for software piracy monetization. The process 300 can be used to impede software piracy and provide steps for the pirates to purchase legitimate software. Similar to the process described in FIG. 2, the process 300 includes a step 305 of providing a computer readable non-transitory storage medium comprising a computer readable code configured to run on a local computer (101, FIG. 1) which is configured to perform a process of impeding software piracy; and a step 310 of running or executing the computer readable code on the local computer.

The process 300 further includes a step 315 of collecting a hardware fingerprint of the local computer. The collection of hardware fingerprint data can be initiated by the computer program, transparent to the user, and may include, for example, identification of network cards, motherboards, and the IP address of the local computer 101. Thus, the computer program builds a unique identifier for identifying the local machine 101. The step 315 of collecting a hardware fingerprint additionally may include gathering application-specific data. In one non-limiting example, application-specific data may include the serial number of the application that is running; product key information; the license ID that identifies the product; and product usage information, such as how many times the application launched.

In one embodiment of the invention, the process 300 may further include a step 320 of connecting the computer program to a feature server (105, FIG. 1). The feature server 105, which may be a dedicated server, can identify by any suitable means which particular installation of the computer program is connecting to the server. For example, the feature server 105 may collect the unique hardware fingerprint data containing serial number and product key information, and create a record unique to the local computer. The records can be stored on the feature server.

The computer program can connect one or more times to the feature server 105. In one example, the application program pings the feature server on a scheduled basis, such as every other day, with details about the local computer, such as that provided in the hardware fingerprint. A new record can be created with each communication, and can be added to the previous records for each unique hardware fingerprint. In this manner, a historical database can be created with the usage history of the machine. In one example, the IP address can be applied to a country lookup table to determine from which country the computer program is communicating (e.g., Germany, Russia, United States, etc.). From this information, the language of the application can be determined and added to the record.

The process 300 may further include a step 325 of verifying the computer program is legitimate and not pirated. In one embodiment of the invention, the serial number of the installed software product is compared at a step 330 against a database of all the (legitimate) serial numbers already generated for that product. The database of legitimate serial numbers may reside on the feature server, the software company server, in the cloud, or at other locations. If the serial number matches an entry in the database, then it is known to be a legitimately issued serial number. However, the validity check is not necessarily over, as will be explained below. If the serial number does not match any entry in the database, then the serial number is assumed to be created fraudulently by a key generator or the like and the status of the local computer is treated as a pirate at a step 335.

Even though a serial number may have matched a legitimate entry in the database at step 330, there is still a possibility the software product is pirated. For example, the serial number may have been "leaked" online to other pirates via forums, shared through a torrent web site, etc. Therefore, in one embodiment of the invention, a database may be created that contains blacklisted serial numbers; that is, those legitimate serial numbers that have been abused and/or overused. Several methods are available to compile the blacklisted serial numbers. For example, the feature server could keep track of the number of times a particular serial number was activated, or how many times it was launched, or Internet searches could yield piracy web sites. A threshold number of activations could be established above which a serial number is considered to be pirated, for example 100 or 1,000. At a step 340, the legitimate serial number passed from step 330 is compared to the database of blacklisted serial numbers and, if a match is found, then the serial number is assumed to be fraudulent and the status of the local computer is treated as a pirate at a step 335. The blacklist database may reside on the feature server, the software company server, in the cloud, on the local computer, or at other locations. Locating the blacklist database on the local computer may have certain advantages such as not having to communicate with the feature server to run a comparison. The feature server could periodically update the blacklist database, but the communication link would be unnecessary to perform the comparison.

If no such match is found with the blacklist records at step 340, the serial number is deemed legitimate and no further action is taken with respect to piracy. The software product may wait a specified time period T at a step 345, such as two days, then proceed to step 315 and collect data for the hardware fingerprint of the local computer. In another example, the time period T is the time between launches of the software product. In other words, the hardware fingerprint data is collected and sent to the feature server whenever the software program is launched. Under normal circumstances, the in-product messaging platform will send a communication from the local computer (e.g., the computer identity, the hardware fingerprint, the serial number, the IP address, etc.) and in response the feature server will send messages that are related to the specific software product back to the computer program on the local machine. For example, the in-product messaging platform may send whatever messaging or content the user is entitled to, including product content, html content, messages, etc.

Figure 3B:
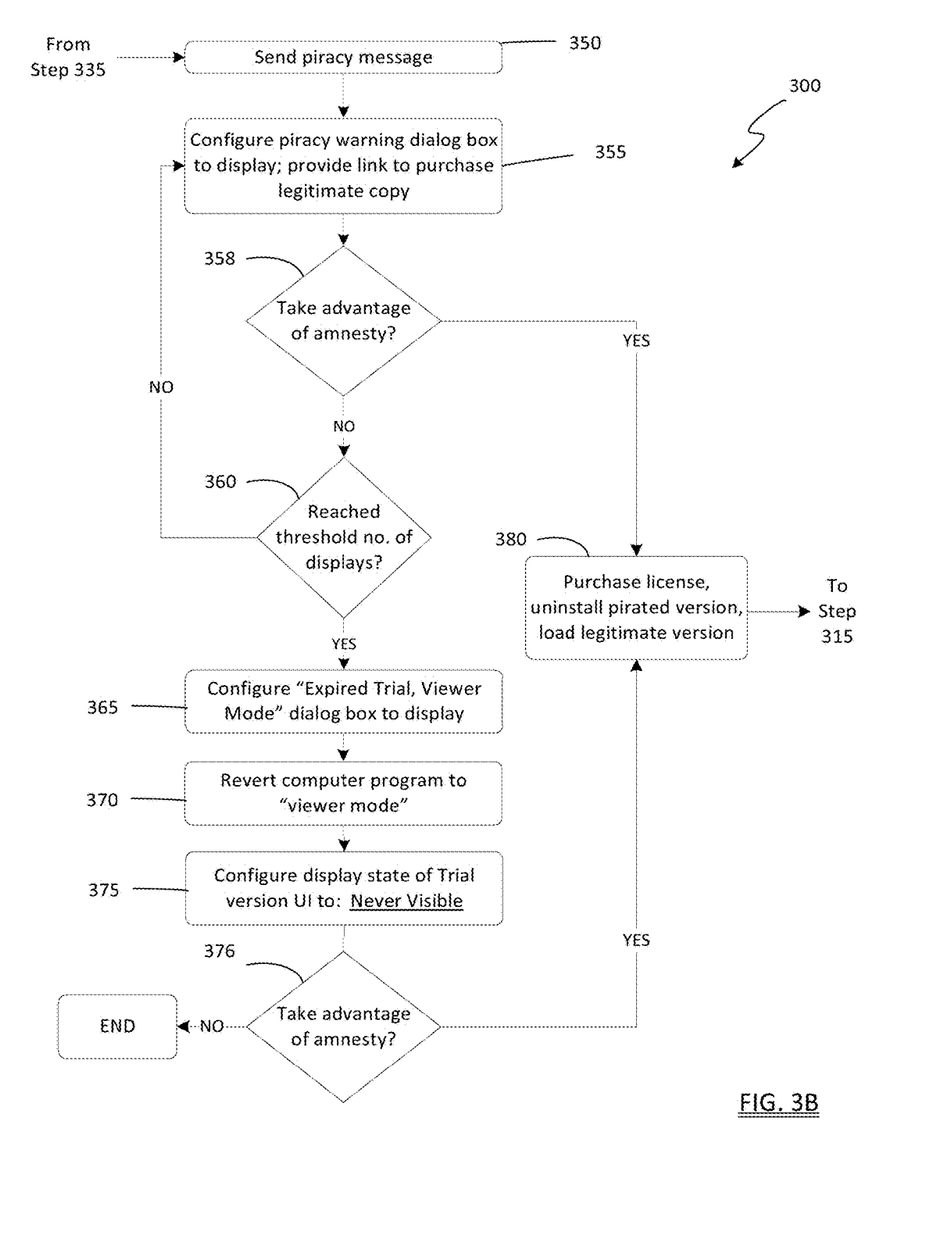

Turning now to FIG. 3B, if the local computer is deemed a pirate, the feature server may send via the in-product messaging platform a property feature record for that installed computer program to arrange one or more configurable features of the computer program as per the feature property state information contained within the sent feature record. For example, at a step 350 a message such as but not limited to a custom cookie may be sent to the local computer with the normal message content. At a step 355, the message or custom cookie may activate a piracy user interface dialog box 356 (FIG. 4) residing dormant in the software product. The normal communication for getting the new messages still takes place, but one of the messages is the piracy message; it associates to the software product. In one example, the piracy message is sent to all users, but only the local machines with the custom cookie will take action on it. The piracy message dialog box 356, when activated, may alert the user that the software product may be pirated. However, the user interface 356 displaying the dialog is not displayed to the user unless the message has been sent to the machine, and the cookie is present, for example. In this manner, the message is used as a condition for the piracy user interface dialog box.

In another example, a piracy message or dialog box may be sent directly from the software company to the local computer for display on the user's screen.

Figure 4:
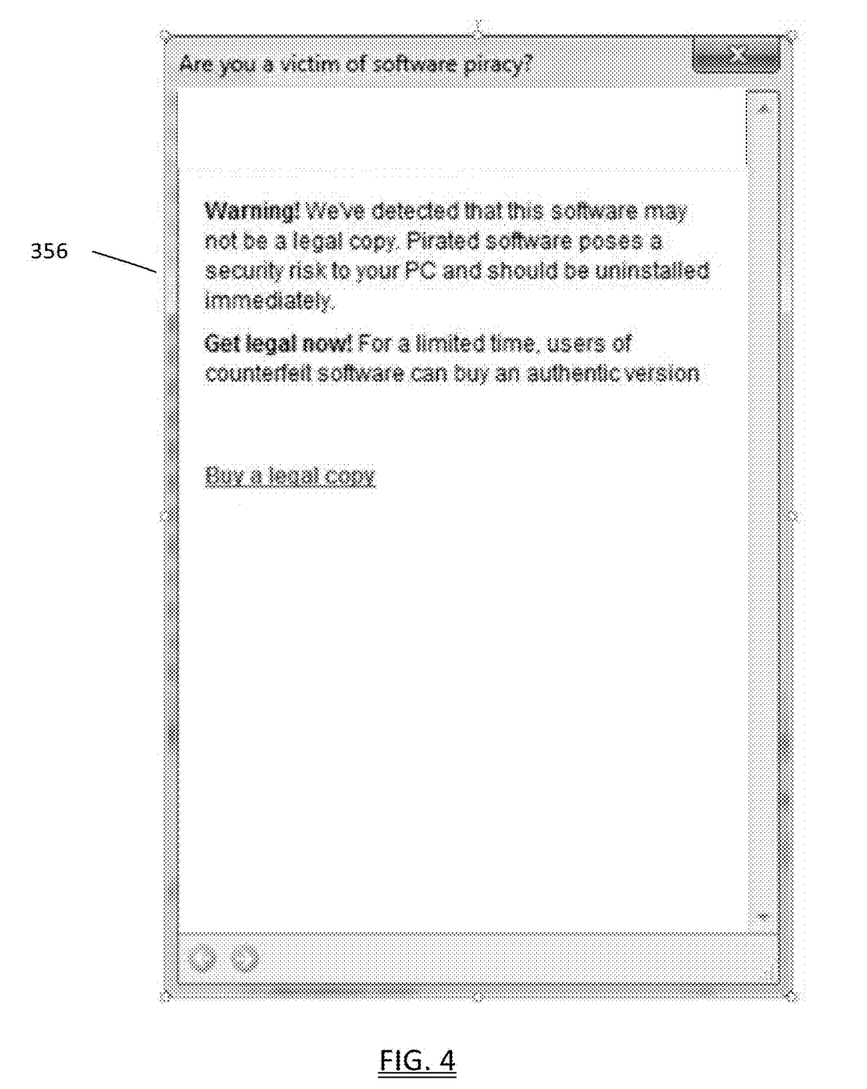
FIG. 4 depicts a user interface dialog box of an exemplary first warning to a suspected user of pirated software.

The process 300 further includes a step 358 to offer the user amnesty from the pirated software. The amnesty offer may, for example, agree not to bring criminal charges in exchange for the user purchasing a legitimate copy of the product. To facilitate the amnesty offer, the piracy message dialog box 356 may include a hyperlink to an online purchase, or a telephone number for the user to call a retailer. In this manner, the user of the pirated version is given the opportunity to purchase a legitimate copy which, if acted on, increases revenue for the manufacturer. When the user purchases a legitimate serial number at a step 380, the process 300 returns to step 315. In one embodiment of the invention, the piracy warning user interface may be set to display a limited number of times, such as three. Once the threshold has been reached at a step 360, a more severe action may be taken at a step 365.

Figure 5:
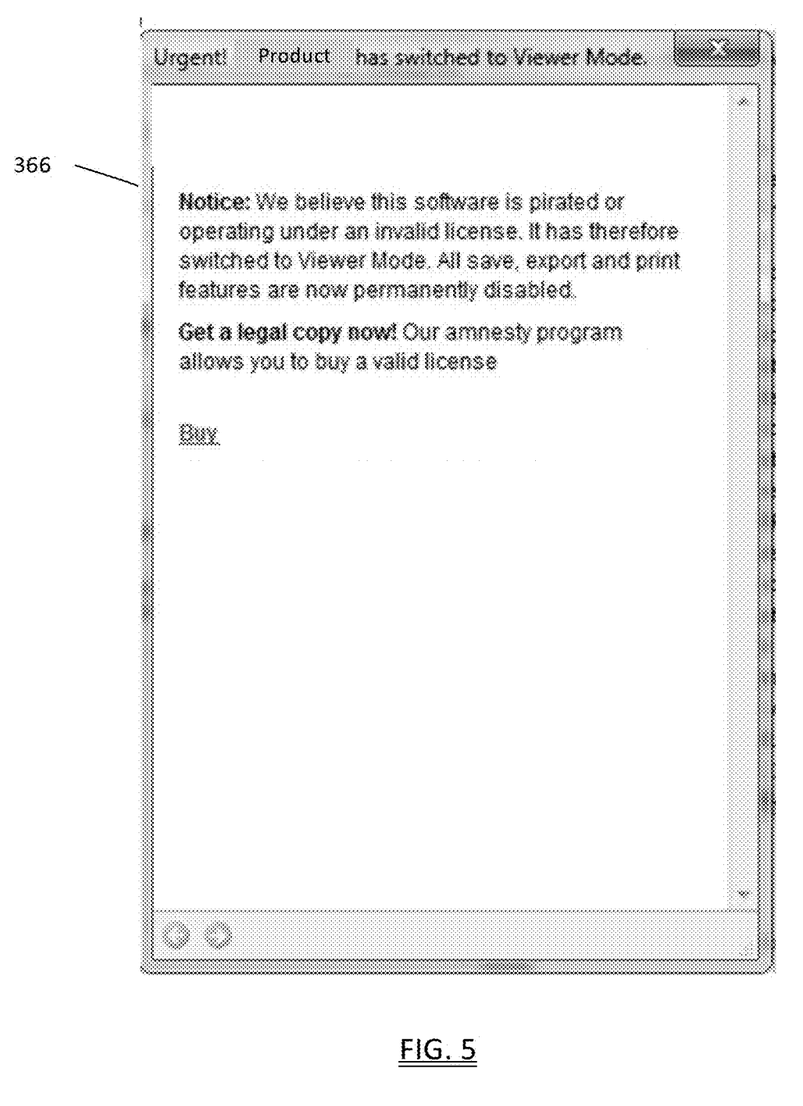
FIG. 5 depicts a user interface dialog box of an exemplary final warning to a suspected user of pirated software.

If the user takes no action in step 355, at a step 365 a second message dialog box 366 (such as that shown in FIG. 5) may be displayed that has an action 370 associated with it. The piracy dialog box 366 notifies the user that the software product is believed to be pirated, and that the product has been reverted to an "expired trial," meaning there is no longer any functionality. Similar to the piracy warning dialog box 355, the user of the pirated version is given the opportunity to purchase a legitimate copy of the product, uninstall the pirated version, and load a clean legitimate version.

In one embodiment of the invention, the reversion of the software product to "Expired Trial" (step 370) may be carried out by utilizing the states available in the software activation platform. The pirate typically loads a trial version of the software, then uses a key generator or the like to obtain a fraudulent serial number and activation code to unlock the product. The activation platform includes a user interface dialog box, or Trial UI, that states the time remaining on the trial version: 30 days remaining, then 29, then 28, etc. The Trial UI may include a button or input field to enter the serial number and activation code if the user legitimately purchased the product previously, or over the phone. The pirate circumvents the activation process by entering the fraudulent serial number and activation code at this point. This simulates the work flow of calling customer service, paying the price of the software, and getting a new serial number and activation code. In other words, the pirate is using the key generator to shortcut or short circuit the activation steps in the software work flow; it simulates that the product communicated with the server and received an activation code back. When the process 300 detects at step 355 that activation has been bypassed, steps are taken that eventually result in the state of the activation being reverted back to an expired product.

In some embodiments of the invention, the computer program at a step 375 changes the displayed state of the Trial UI (that allows entry of serial number and activation code) to "hidden" or "never visible." In this manner, the pirate is prevented from entering a different fraudulent serial number and activation key.

The pirate can be offered a second opportunity for amnesty at a step 376. As in step 358, the piracy message dialog box 376 may include a hyperlink to an online purchase. In this manner, the user of the pirated version is given the opportunity to purchase a legitimate copy which, if acted on, increases revenue for the manufacturer. When the user purchases a legitimate serial number at a step 380, the process 300 returns to step 315.

One advantage of the disclosed process 300 is that the data gathering and message sending functions are autonomous. That is, because they only rely on hardware and software configurations for identification, the computer programs never learns the personal identity of the user, which is beneficial for privacy concerns.

Further description of the software piracy monetization process is provided in commonly owned U.S. Provisional Application Ser. No. 61/861,358, filed Aug. 1, 2013, entitled "SYSTEM AND METHOD FOR SOFTWARE PIRACY MONETIZATION", which application is incorporated herein by reference in its entirety for all purposes.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

What is claimed is:

1. A method for software validation comprising the steps of:
    providing a computer readable non-transitory storage medium forming part of a local computer storing computer readable code as a software product configured to run on the local computer including at least a microprocessor and a display, the software product including one or more configurable features having a feature property, the feature property having a state;
    executing the computer readable code on the local computer to run the software product;
    collecting, during execution of the computer readable code, hardware fingerprint data relating to the local computer and including a serial number of the software product that is running, product key information, a license ID that identifies the software product, or software product usage information;
    connecting, by the local computer, with a computer feature server and transmitting the hardware fingerprint data to the computer feature server;
    determining if the software product installation is legitimate in dependence upon at least the hardware fingerprint data and legitimate software data stored upon the computer feature server; and
    upon determining the installed software product is not legitimate sending a message to the local computer-comprising instructions to change the state of a feature property of the software product and generate an alert for presentation to the user upon the display to alert a user that the software product is not legitimate.

2. The method of claim 1, wherein the hardware fingerprint data further comprises a network card, a motherboard, or an IP address of the local computer.

3. The method of claim 1, wherein the step of determining if the software product is legitimate comprises comparing a serial number of the software product against a database of legitimate serial numbers already generated for that software product.

4. The method of claim 1, wherein the step of determining if the software product is legitimate comprises comparing a serial number of the software product against a database of blacklisted serial numbers stored upon the computer feature server.

5. The method of claim 1, wherein the step of determining if the software product is legitimate comprises comparing a serial number of the software product against a database of blacklisted serial numbers stored upon the computer feature server, each blacklisted serial number comprises a legitimate serial number of the software product that has been used in software product installations more than a threshold number of times.

6. The method of claim 5, wherein the threshold number of times is greater than 100.

7. The method of claim 5, wherein the threshold number of times is greater than 1,000.

8. The method of claim 1, wherein the step of determining if the software product is legitimate is determined by the feature server using the hardware fingerprint data.

9. The method of claim 1, wherein the instructions to change the state of a feature property on the local computer comprises changing a display state of a user interface for the computer product on the local computer to not visible.

10. The method of claim 1, wherein
    the alert is a piracy dialog box displayed upon the display that warns the user that the software product may not be legitimate; and
    the alert is either contained within the software product and activated by the message or contained within the message.

11. The method of claim 1, wherein
    the alert is a piracy dialog box displayed upon the display that notifies the user that the state of the software product has changed; and
    the alert is either contained within the software product and activated by the message or contained within the message.

12. The method of claim 1, wherein the instructions to change the state of a feature property on the local computer comprise reverting the state of the software product to a trial mode.

13. The method of claim 1, wherein the alert is a user interface relating to an activation user interface or trial user interface, and the display state for the computer product is changed to not visible or hidden.

14. The method of claim 1, further comprising a step of offering a legitimate version of the software product and an amnesty to the user of a pirated version of the software product upon their purchase of the legitimate version.

15. The method of claim 14, wherein the offer comprises purchasing a license to the legitimate version of the software product.

* * * * *